(12) United States Patent
Ellison et al.

(10) Patent No.: US 9,531,928 B2
(45) Date of Patent: Dec. 27, 2016

(54) GIMBAL SYSTEM WITH IMBALANCE COMPENSATION

(71) Applicant: FLIR Systems, Inc., Wilsonville, OR (US)

(72) Inventors: Bruce Ellison, Lake Oswego, OR (US); Kevin E. Jones, Portland, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/794,668

(22) Filed: Jul. 8, 2015

(65) Prior Publication Data

US 2016/0014309 A1    Jan. 14, 2016

Related U.S. Application Data

(60) Provisional application No. 62/022,021, filed on Jul. 8, 2014.

(51) Int. Cl.
| | |
|---|---|
| *F16M 13/00* | (2006.01) |
| *H04N 5/225* | (2006.01) |
| *F16C 11/04* | (2006.01) |
| *F16M 13/02* | (2006.01) |
| *G02B 27/64* | (2006.01) |
| *G02B 7/00* | (2006.01) |

(52) U.S. Cl.
CPC ............. *H04N 5/2254* (2013.01); *F16C 11/04* (2013.01); *F16M 13/02* (2013.01); *G02B 7/001* (2013.01); *G02B 27/644* (2013.01); *H04N 5/2251* (2013.01); *H04N 5/2252* (2013.01)

(58) Field of Classification Search
CPC ........ F16M 11/18; F16M 13/04; F16M 13/02; G03B 17/561; H04N 5/2254; F16C 11/04
See application file for complete search history.

(56) References Cited

U.S. PATENT DOCUMENTS

| | | |
|---|---|---|
| 5,489,099 A | 2/1996 | Rankin et al. |
| 2010/0310242 A1 | 12/2010 | Zubalsky et al. |
| 2011/0193943 A1 | 8/2011 | Campbell |
| 2014/0288694 A1* | 9/2014 | Wagner .................. F16M 11/18 700/213 |

OTHER PUBLICATIONS

Young, Lee W., U.S. Receiving Office, "International Search Report" in connection with related International Patent Application No. PCT/US2015/039606, dated Sep. 29, 2015, 2 pages.
Young, Lee W., U.S. Receiving Office, "Written Opinion of the International Searching Authority" in connection with related International Patent Application No. PCT/US2015/039606, dated Sep. 29, 2015, 7 pages.

* cited by examiner

*Primary Examiner* — Amy Sterling
(74) *Attorney, Agent, or Firm* — Kolisch Hartwell, P.C.

(57) ABSTRACT

A gimbal assembly may include an imbalance compensation system having a driver operatively connected to a movable weight. A controller may determine a compensating position for the movable weight to counterbalance an effective moment imparted on the gimbal assembly by one or more movable components therein. The controller may command the driver to relocate the movable weight to the compensating position.

14 Claims, 11 Drawing Sheets

GIMBAL SYSTEM WITH IMBALANCE COMPENSATION

CROSS-REFERENCES

The present application claims priority to U.S. Provisional Patent Application Ser. No. 62/022,021, filed on Jul. 8, 2014, which is hereby incorporated herein, in its entirety, for all purposes. The following related applications and materials are also incorporated herein, in their entireties, for all purposes: U.S. Pat. No. 7,264,220; U.S. Pat. No. 7,671,311; U.S. Pat. No. 8,385,065; and PCT Publication No. WO 2012/170673.

INTRODUCTION

Imaging systems typically include an objective (e.g., a zoom lens) for receiving and focusing incident radiation onto a sensor. The sensor, and an associated processor, may produce a digital image corresponding to the optical information received by the sensor. Gimbal systems permit payloads, such as optical devices (e.g., imaging systems and lasers), to be mounted to and used on a support platform. For example, vehicles, such as aircraft, watercraft, and ground vehicles, may provide moving support platforms for gimbal systems. Whether moving or stationary, a gimbal system may be used to enable a payload to be accurately reoriented with respect to the support platform. As an example, the payload may include a camera that can be panned and tilted with respect to the support platform to survey or monitor a broad field of view.

Gimbal systems may be stabilized, at least in part, by arranging various components such that the center of gravity (CG) of the system is located at the geometric center of the gimbal axes. If the CG is not centered in the gimbals, then vibration or other motion of the system may cause the gimbals to compensate by rotating about their axes in an undesirable condition known as "jitter." In a jitter situation, the gimbals may wobble about their axes at the frequency of the vibration and in direct proportion to the linear force being experienced. Accordingly, anything that changes the location of the CG may cause jitter. In gimbals equipped with movable components, such as zoom lenses, the CG may be displaced as the lenses within the zoom assembly, or other movable components in the payload, are repositioned during normal operation.

SUMMARY

The present disclosure provides systems, apparatuses, and methods relating to gimbal assemblies having imbalance compensation systems. In some embodiments, a gimbal system may include a support portion; a gimbal assembly pivotably connected to and supported by the support portion; and a payload pivotably orientable with respect to the support portion by the gimbal assembly, to provide pan and tilt movement of the payload. The payload may include a selectively positionable component such that repositioning of the component has an effect on a center of gravity (CG) of the gimbal assembly, an imbalance compensator having a movable weight operatively connected to a driver, and a controller in operative communication with the imbalance compensator. The controller may be configured to counteract the effect of the positionable component on the CG by causing the imbalance compensator to reposition the movable weight.

In some embodiments, a gimbal system may include a support portion; a gimbal assembly pivotably connected to and supported by the support portion; a payload pivotably orientable with respect to the support portion by the gimbal assembly, to provide pan and tilt movement of the payload, the payload including an imbalance compensator having a weight selectively movable within the payload along a first axis; and a controller configured to determine a compensating position of the weight of the imbalance compensator, such that the compensating position negates an imbalance in the gimbal assembly.

An illustrative method for maintaining a desired center of gravity in a gimbal system, the method may include receiving, by a processor, information corresponding to a respective current position of one or more movable components in a gimbal assembly; and determining, by the processor, a compensating position of a movable weight in the gimbal assembly, such that the compensating position negates an effective moment on the gimbal assembly caused by the respective current positions of the one or more movable components.

Features, functions, and advantages may be achieved independently in various embodiments of the present disclosure, or may be combined in yet other embodiments, further details of which can be seen with reference to the following description and drawings.

DESCRIPTION

Figure 1:
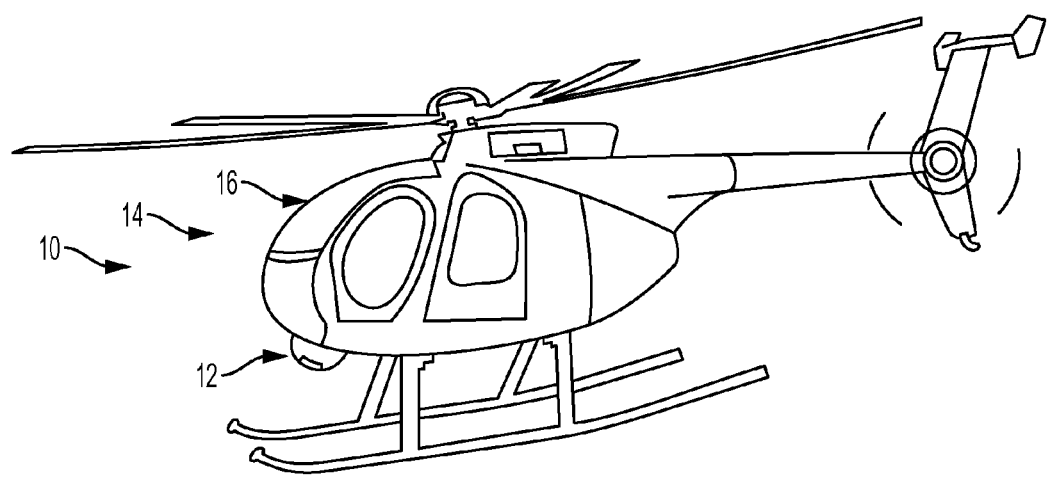
FIG. 1 is a view of an exemplary gimbal system including a turret unit mounted to an exterior of a support platform (namely, a helicopter), in accordance with aspects of the present disclosure.

Various embodiments of a gimbal system having an imbalance compensation system, as well as related methods, are described below and illustrated in the associated drawings. Unless otherwise specified, such an imaging system and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other embodiments and similar gimbal systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

In general, an imbalance compensation system may include a movable mass, a positioning system for the movable mass, and a controller configured to monitor one or more movable mechanisms in a host gimbal system. When the controller (also referred to as, incorporated into, and/or comprising a processor) detects that a monitored mechanism has changed position, the controller determines the proper position of the movable mass to maintain the center of gravity (CG) by compensating for said change. The controller then sends a command to the positioning system to relocate the mass to the proper position. Multiple movable mechanisms may be monitored. In some examples, a plurality of imbalance compensation systems (e.g., two or three movable masses with respective positioning systems) may be utilized.

In general, a movable mass must have a direction of travel that is parallel to the direction(s) of travel of the associated movable mechanisms. Accordingly, movable mechanisms may be grouped by their common direction of travel, with each group having a corresponding imbalance compensation system with a parallel movable mass. For example, a first group of movable mechanisms may have a first direction of travel, such that all associated movable mechanisms have component(s) that travel parallel to a first axis. Similarly, a second group of movable mechanisms may have a second direction of travel, such that all associated movable mechanisms have component(s) that travel parallel to a second axis. In this example, a first imbalance compensation system with a first mass movable parallel to the first axis may be used to maintain the CG relative to the first group of mechanisms. Likewise, a second imbalance compensation system with a second mass movable parallel to the second axis may be used to maintain the CG relative to the second group of mechanisms.

In some examples, travel of the movable mass may be linear, curvilinear, continuous, or discrete, or any combination of these, depending on the travel of the components being compensated for. Compensators having linear (i.e., straight-line) travel will be described below. Other configurations may be utilized, as appropriate.

Various imbalance compensation systems may share a common controller, or may have respective controllers. In the examples below, a single imbalance compensation system may be described. However, it is to be understood that two or more such systems may be incorporated into a host, depending on the configuration of movable components, among other considerations.

As described above, the imbalance compensation system may be suitable for use in gimbal systems and other host devices. An imbalance compensation system in accordance with aspects of the present disclosure may be suitable for use in a pan and tilt device. Pan and tilt (also termed "pan-tilt") devices may include any suitable device configured to provide real-time, computer-controlled positioning of a payload. Payloads may include thermal cameras, video cameras, IP cameras, laser rangefinders, microwave antennas, and/or the like, or any combination of these (as described further below). Pan-tilt devices may carry multi-sensor camera systems and antennas, and may include multiple mounting options for fixed and mobile applications. In some examples, a pan-tilt device may include inertial Line of Sight (LOS) stabilization of a payload from mobile platforms including ground, air, and sea. Inertial stabilization facilitates real-time computer control during stabilization, enabling closed loop systems for tracking and slew-to-cue.

Systems of the present disclosure may also be suitable for use in fixed or static systems and/or in a gimbal system, among others. A gimbal system typically includes a gimbal assembly pivotably connected to and supported by a support portion. The support portion, in turn, may include electronic components, such as a processor or controller. The gimbal system may include a payload, such as an optical detection device, which may be in communication with one or more of the electronic components. The payload may be supported by the gimbal assembly and pivotably orientable with respect to the support portion. Pivotable orientation may be achieved about a pair of nonparallel axes by controlled, driven motion of the gimbal assembly, thereby providing pan and tilt movement of the payload.

The payload may include one or more optical systems configured to receive optical input and process the optical input via one or more sensors. Systems and methods are described below, in which CG changes caused by movable mechanisms, such as zoom lenses, may be compensated for by a controlled, positionable mass.

The following sections describe selected aspects of exemplary gimbal systems, as well as related systems and/or methods. The examples in these sections are intended for illustration and should not be interpreted as limiting the entire scope of the present disclosure. Each section may include one or more distinct examples, and/or contextual or related information, function, and/or structure. These sections include (I) definitions, (II) overview of an exemplary gimbal system, (III) support portions, (IV) gimbal assemblies, (V) payloads, (VI) support platforms, (VII) overview of an imbalance compensation system, (VIII) a gimbal assembly having an imbalance compensation system, (IX) balance control algorithms, (X) a method for maintaining a center of gravity in a gimbal system having movable components, and (XI) selected embodiments.

I. Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation—Invisible electromagnetic radiation having wavelengths from about 100 nm, just longer than x-ray radiation, to about 400 nm, just shorter than violet light in the visible spectrum. Ultraviolet radiation includes (A) UV C (from about 100 nm to about 280 or 290 nm), (B) UV B (from about 280 or 290 nm to about 315 or 320 nm), and (C) UV A (from about 315 or 320 nm to about 400 nm).

Visible light—Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II. Overview of an Exemplary Gimbal System

FIG. 1 shows an exemplary gimbal system 10 including a turret unit 12 (also termed a gimbal apparatus) mounted to the exterior of a support platform 14. In the present illustration, support platform 14 is a vehicle, namely, a helicopter 16. In other examples, support platform 14 may include a boat or land-based vehicle. In some examples, turret unit 12 may be oriented differently, such as by mounting at a lower end rather than an upper end as shown in FIG. 1.

Figure 2:
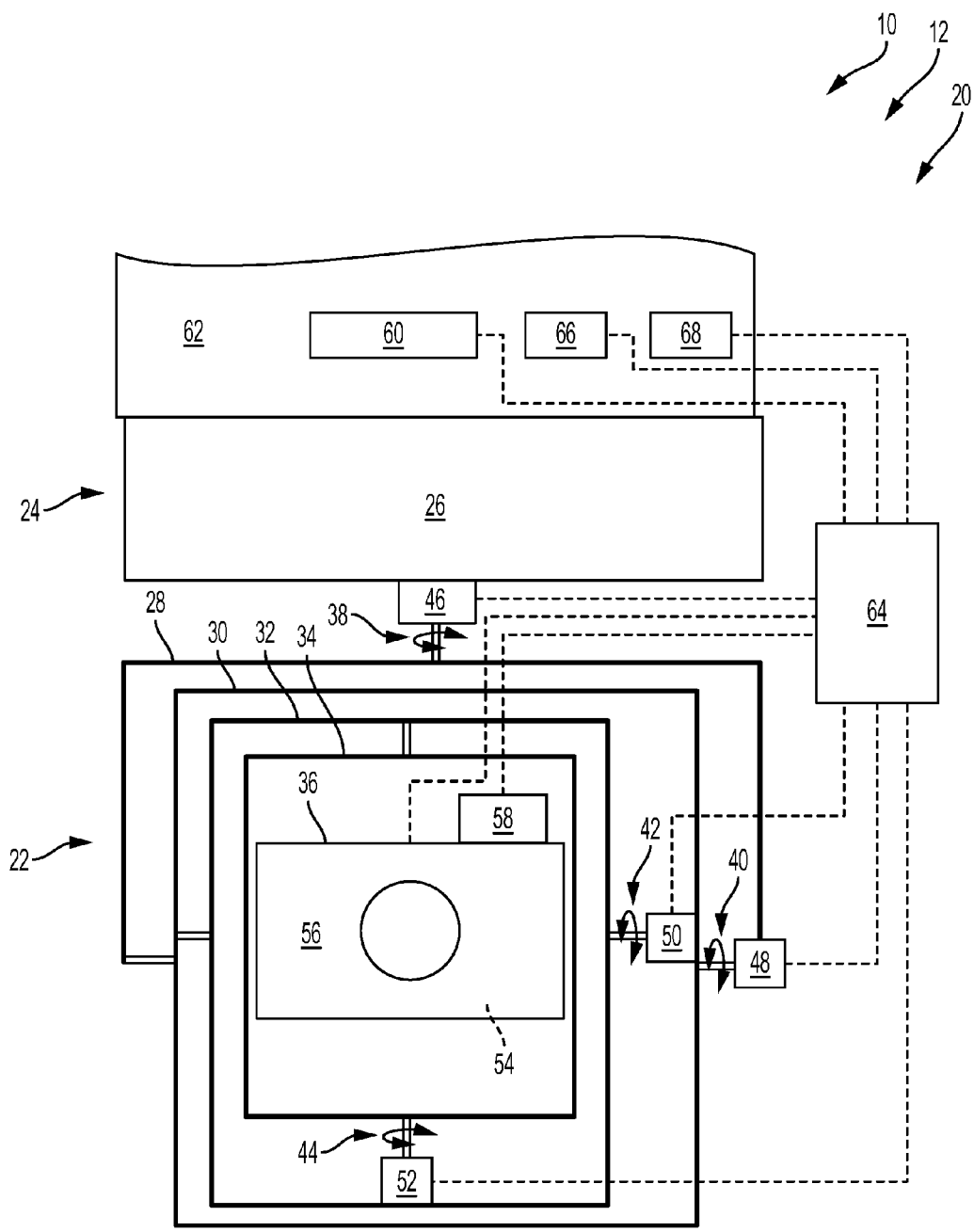
FIG. 2 is a schematic view of selected aspects of the gimbal system of FIG. 1, in accordance with aspects of the present disclosure.

FIG. 2 shows a schematic view of selected aspects of a gimbal system 20, which is an embodiment of gimbal system 10. A gimbal assembly 22 may be connected to and supported by mount 26 (e.g., with the gimbal assembly located below or above the mount, among others) and may be pivotable collectively with respect to the mount (and the vehicle). The mount and/or a portion thereof may be relatively stationary with respect to vehicle 28, and the gimbal assembly may be relatively movable with respect to the vehicle. System 20 also may be equipped with a payload 30 (e.g., including at least one or more optical devices, such as at least one light source and/or an optical sensor (e.g., an image sensor of a camera 32)) that is orientable with respect to mount 26 (and the vehicle) by rotation of gimbals of gimbal assembly 22 about a plurality of axes (e.g., at least two nonparallel axes and/or a pair of orthogonal axes, among others).

A mount 24 may include one or more frame members 26. A frame member may be secured to a support platform via attachment features of the frame member (and/or with one or more brackets, among others). For example, the frame member may define a set of apertures to receive fasteners. The apertures may have any suitable position, such as being disposed generally centrally or near a perimeter of the frame member.

Gimbal assembly 22 may comprise a series of two or more gimbals, such as first through fourth gimbals 28, 30, 32, and 34. Each gimbal is pivotably connected to preceding and succeeding gimbals of the series, for example, via one or more axle members or axle assemblies. First gimbal 28 supports second through fourth gimbals 30, 32, 34, and payload 36, and is pivotably connected to and supported by frame member 26 for rotation about a first axis 38 (e.g., a first yaw, azimuthal, and/or vertical axis), which may extend at least generally centrally through mount 24 and/or frame member 26. Second gimbal 30 supports third and fourth gimbals 32, 34 and payload 36, and is pivotably connected to and supported by first gimbal 28 for rotation about a second axis 40 (e.g., a first pitch, elevational, and/or horizontal axis), which may be orthogonal to first axis 38. Third gimbal 32 supports fourth gimbal 34 and payload 36, and is pivotably connected to and supported by second gimbal 30 for rotation about a third axis 42 (e.g., a second pitch, elevational, and/or horizontal axis). Third axis 42 may be parallel to, and/or or coaxial with second axis 40 (or first axis 38 with the gimbal assembly in a neutral position). Fourth gimbal 34 supports payload 36, and is pivotably connected to and supported by third gimbal 32 for rotation about a fourth axis 44 (e.g., a second yaw, azimuthal, and/or vertical axis). Fourth axis 44 may be parallel to, and/or coaxial with first axis 38 (or second axis 40 with the gimbal assembly in a neutral position). The payload may or may not be fixed to the fourth gimbal. In some cases, rotation of first and second gimbals 28 and 30 may provide larger adjustments to the orientation of payload 36, and rotation of third and fourth gimbals 32 and 34 may provide smaller adjustments to the orientation (or vice versa).

Rotation of each gimbal 28-34 may be driven by a drive mechanism, such as respective motors 46, 48, 50, and 52. Each motor may be attached to its corresponding gimbal or to the structure that supports the gimbal, or a combination thereof. For example, motor 46 may be attached to frame member 26 or first gimbal 28; motor 48 to first gimbal 28 or second gimbal 30; and so on. The angular orientation of the payload may be adjusted horizontally and vertically via rotation of gimbals 28-34, without changing the orientation of the support platform, and/or the payload may continue to point at a target as the attitude and location of the support platform changes, among others. Accordingly, the gimbal system may allow one or more fixed and/or moving targets to be monitored or tracked over time from a fixed and/or moving support platform.

The gimbal system also may comprise one or more sensors to sense aspects of the vehicle, of one or more gimbals, of the payload, or of a target. Exemplary sensors include an orientation sensor (e.g., a gyroscope that measures angular position or rate of angular change, among others), an accelerometer, an optical sensor to detect optical radiation (e.g., an image sensor 54 in a camera 56), or the like, or any combination of these. At least one gimbal of the gimbal assembly and/or the payload may be attached to at least one gyroscope 58 to measure the orientation of the gimbal and/or payload. In some cases, the gimbal system may include at least one inertial measurement unit (IMU) 60, which may be carried by gimbal assembly 22 (e.g., by payload 36 or fourth gimbal 34), and/or a supporting vehicle 62. The IMU may include sensors to measure acceleration along three orthogonal axes and angular position/change about three orthogonal axes. Measurements from unit 60 alone or in combination with those from one or more other gyroscopes of the gimbal assembly may be used to aim the payload with respect to an inertial reference frame (e.g., the earth), as the vehicle travels with respect to the reference frame.

Gimbal system 20 also may comprise a processor 64, and a user control unit 66 to communicate inputs, such as user preferences, commands, etc., to the processor. The processor may be included in gimbal assembly 22 (and/or mount 24), vehicle 62, or a combination thereof, among others. The user control unit may be disposed in the vehicle, if the vehicle has a person onboard, or may be disposed elsewhere (e.g., on the ground) if the vehicle is unmanned.

The processor may include any electronic device or set of electronic devices responsible for signal processing, manipulation of data, and/or communication between or among gimbal system components. The processor may be localized to one site or may be distributed to two or more spaced sites of the gimbal system. The processor may be programmed to receive user inputs from user control unit 66 and to control operation of and/or receive signals from any suitable system components, as indicated by dashed lines in FIG. 2, for example, the motors, sensors (e.g., one or more optical devices, one or more IMU's, gyroscopes, accelerometers, etc.), payload 36, a display 68 carried by vehicle 62, and so on. Accordingly, the processor may be in communication with the motors, sensors, and display, to receive signals from and/or send signals to these devices, and may be capable of controlling and/or responding to operation of these devices. Also, the processor may be responsible for manipulating (processing) image data (e.g., a representative video signal) received from camera 56 before the signal is communicated to display 68, to drive formation of visible images by the display.

Gimbal assembly 22 may include and/or be connected to a power supply. The power supply may include any mechanism for supplying power, such as electrical power, to the motors, sensors, payload, processor, etc. The power supply may be provided by the support platform, the mount, the gimbal apparatus, or a combination thereof, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

Additional features and aspects that may be suitable for the gimbal system are disclosed, for example, in U.S. Pat. No. 7,671,311.

III. Support Portions

A support portion may be any part of a gimbal system that supports a gimbal assembly. In some cases, the support portion may include a mounting/control portion that connects a gimbal assembly to a support platform and/or that carries electronics providing one or more aspects of gimbal system control and/or data processing. The support portion may form an end region of a turret unit. Also, this portion may be unstabilized and may be termed a "skillet."

The support portion may support a gimbal assembly and may be connected directly to at least one gimbal and connected indirectly to one or more additional gimbals of the gimbal assembly. The support portion, in turn, may be attached to a support platform (see Section VI) or may rest upon a support platform without attachment thereto. The support portion may be mounted to a support platform via any suitable mechanism, with any suitable orientation. For example, when used with a vehicle, a support portion (and/or the corresponding turret unit) may be bottom-mounted, side-mounted, top-mounted, front-mounted, rear-mounted, externally mounted, internally mounted, and/or so on. Moreover, such mounting may be static or dynamic, for example, involving additional gimbal(s) to provide dynamic mounting. The support portion may carry and/or contain any suitable components of a turret unit, including a controller (s), power supply, electrical conduits or other electrical circuitry, a fan(s), and/or the like.

The support portion may have any suitable shape. In some embodiments, the support portion may be at least generally cylindrical. The support portion may be shaped at least generally as a disc.

IV. Gimbal Assemblies

A gimbal assembly, as used herein, is a hierarchical arrangement of two or more pivotable members (gimbals). A gimbal assembly may include a higher-order gimbal pivotally coupled directly to a support portion. The gimbal assembly also may include a lower-order gimbal pivotally coupled directly to the higher-order gimbal and indirectly to the support portion, such that the lower-order gimbal is carried by the higher-order gimbal. As a result, pivotal motion of the higher-order gimbal in relation to the support portion results in collective pivotal motion of both gimbals, whereas pivotal motion of the lower-order gimbal may be independent of the higher-order gimbal. The gimbal assembly further may include any suitable number of additional lower-order gimbals that are pivotally coupled directly to a relatively higher-order gimbal and/or that carry an even lower-order gimbal.

A gimbal assembly may be configured to rotate a payload about any suitable or desired number of axes, including 2, 3, 4, 5, 6, or more axes. In some embodiments, some of the axes of rotation may be collinear or coplanar. The axes of rotation typically are either orthogonal to one another or parallel to (including collinear with) one another, although this is not required. In some embodiments, parallel axes of rotation, or substantially parallel axes, can be used to provide increased precision, with a first level of rotation about a first axis providing coarser large-magnitude adjustments and a second level of rotation about a second axis (parallel or nonparallel) to the first axis providing finer small-magnitude adjustments.

Each gimbal of a gimbal assembly may be capable of any suitable pivotal motion. The pivotal motion may be a complete revolution (360 degrees) or less than a complete revolution. In some embodiments, the gimbal assembly may include a hierarchical arrangement of major and minor gimbal pairs. The major gimbal pair may be a pair of gimbals having a relatively larger range of angular motion (such as greater than about 90 degrees). The minor gimbal pair may be a pair of gimbals that are pivotally coupled to the major gimbal pair (and indirectly to the support portion) and having a relatively smaller range of angular motion (such as less than about 90 degrees).

Each gimbal of a gimbal assembly may be driven controllably by a driver. An exemplary driver that may be suitable is described in U.S. Pat. No. 7,561,784.

V. Payloads

A payload includes any device that is carried and aimed by a gimbal assembly. The payload may include one or more detectors and/or emitters, among others. A detector generally comprises any mechanism for detecting a suitable or desired signal, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a controller that sends signals to and/or receives signals from the payload. The payload may be coupled (generally via a controller) to a display such that signals from the payload may be formatted into a visual form for viewing on the display. The present disclosure may be especially useful when the payload contains high heat-emitting components, such as lasers, radars, millimeter-wave (MMW) imagers, light detection and ranging (LIDAR) imagers, mine-detection sensors, and/or inertial measurement units (IMUs).

In some embodiments, the payload may form a detection portion (or all) of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CODs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), (5) subtractive elements (such as filters), and/or (6) electro-optic elements (such as a Kerr cell or a Pockels cell), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present disclosure may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like.

Further aspects of imaging systems that may be suitable for the gimbal system of the present disclosure are described in the following patent, which is incorporated herein by reference: U.S. Pat. No. 7,515,767.

VI. Support Platforms

The gimbal system of the present disclosure may include a turret unit supported by a support platform. A support platform, as used herein, generally refers to any mechanism for holding, bearing, and/or presenting a turret unit and its payload. The support platform may be moving, movable but stationary, or fixed in relation to the earth, and may be disposed on the ground, in the air or space, or on and/or in water, among others. In any case, the support platform may be selected to complement the function of the turret unit and particularly its payload.

The support platform may be movable, such as a vehicle. Exemplary vehicles include a ground vehicle (e.g., a car, truck, motorcycle, tank, etc.), a watercraft (e.g., a boat, submarine, carrier, etc.), an aircraft or airborne device (e.g., a fixed-wing piloted aircraft, pilotless remote-controlled aircraft, helicopter, drone, missile, dirigible, aerostat balloon, rocket, etc.), or the like.

The support platform may be fixed in position. Exemplary fixed support platforms may include a building, an observation tower, and/or an observation platform, among others. In some embodiments, the support platform may be a temporarily stationary movable support, such as a hovering helicopter and/or a parked car, truck, or motorcycle, among others.

A gimbal system with a moving, temporarily stationary, or fixed support platform may be used for any suitable application(s). Exemplary applications for a gimbal system include navigation, targeting, search and rescue, law enforcement, firefighting, and/or surveillance, among others.

VII. Imbalance Compensation Systems

This example describes aspects of illustrative imbalance compensation systems; See FIGS. 3-9.

Figure 3:
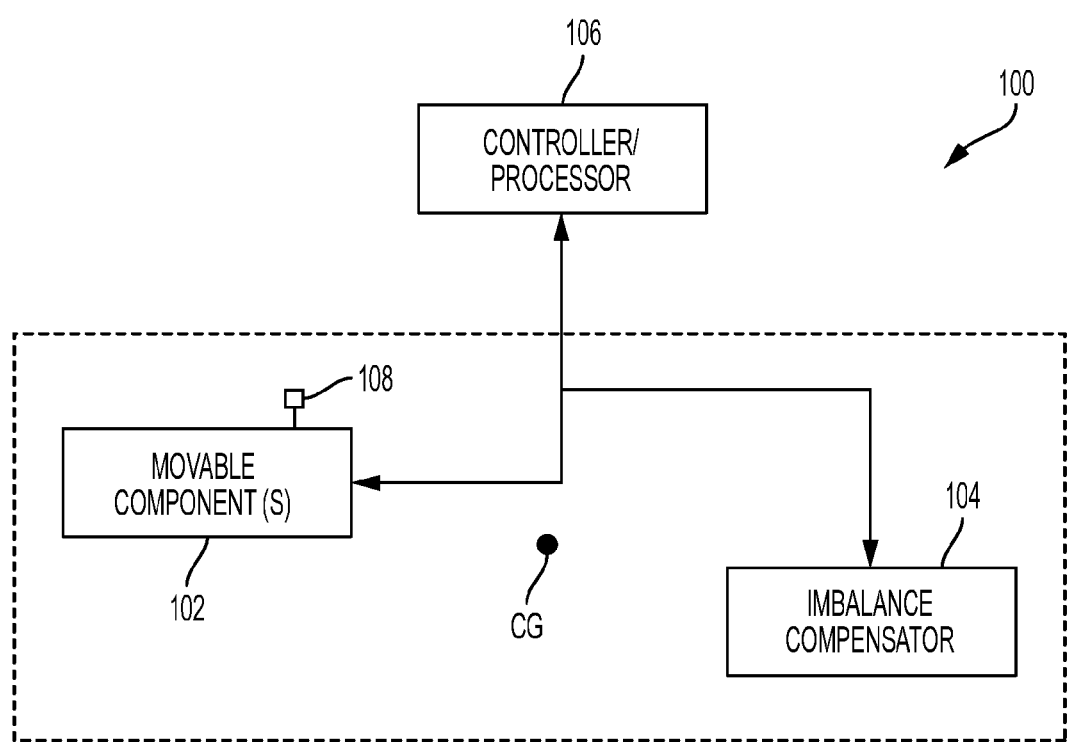
FIG. 3 is a schematic view of an illustrative imbalance compensation system having one or more moving components and an imbalance compensator, in accordance with aspects of the present disclosure.

With reference to the schematic diagram of FIG. 3, a first exemplary turret unit may incorporate a payload 100 with one or more movable components 102 and an imbalance compensator 104.

In general, payload 100 may include one or more components that are designed to be translated, rotated, and/or a combination of translated and rotated, either linearly or otherwise, continuously and/or discretely. Collectively represented by movable component 102, the aforementioned movement or movements may result in an imbalance in the payload by shifting the overall center of gravity CG of the payload. Without compensation, this shift may result in deleterious or undesired effects, such as jitter.

Imbalance compensator 104 may include any device or structure configured to selectively move a known mass by a desired amount, such as in response to a signal from a controller 106. For example, imbalance compensator 104 may include a block, ball, weight, slug, cylinder, and/or cone (or any other similar object), or combinations thereof, of known mass operatively connected to a positioning device, such as a motor or other prime mover. For example, imbalance compensator 104 may include a threaded block on a lead screw driven by a stepper motor. In some examples, imbalance compensator 104 may be a dedicated component or device used solely for imbalance compensation. In some examples, imbalance compensator 104 may include a component or device having another function in addition to imbalance compensation. For example, a lens in an unused first optical device may be moved to compensate for movement of a lens in an in-use second optical device. In some examples, imbalance compensator 104 may include a plurality of masses positionable by one or more positioning devices, such that the net effect is to maintain or return overall CG to a desired location.

In some examples, the weight of one or more movable components may be adjusted to reduce the amount of imbalance compensation necessary. For example, the mass of one or more lens elements (e.g., lens cells), may be altered such that motion of the lens elements has less of an effect on the overall center of gravity. This may be accomplished, for example, by making one or more lens cells thicker (or thinner) and/or using materials of different density (e.g., steel vs. aluminum). Alteration of movable lens component weights may result in a reduced change in the center of gravity. Such alteration may result in some reduction in performance of the lens. However, a reduction in the size or the necessary density of imbalance compensator 104 may lead to a reduction in manufacturing and/or material costs, and/or a reduction in the footprint needed for imbalance compensation mechanisms.

Controller 106 may include any suitable electronic control system capable of processing instructions and interacting via inputs and outputs with at least imbalance compensator 104, and may include or be a part of processor 64 described above. Controller 106 may receive information regarding a position or state of movable component 102. For example, controller 106 may subscribe to a respective position sensor 108 associated with each movable component. In response, controller 106 may determine the effect of that positioning on CG and/or determine a response to compensate and return the CG to the desired CG location. In some examples, known movements of component 102 may result in predictable, calculable, and/or known effects on CG, in which case appropriate responses may be dynamically calculated based on the known change in CG as a function of the position of component 102, determined ahead of time and hard-coded or hard-wired into the controller, or some combination thereof. In some examples, controller 106 may provide a signal to imbalance compensator 104 to reposition the compensating mass by a calculated, known, and/or predetermined amount to counteract the effects of component 102 on CG. In some examples, controller 106 may simultaneously command the movement of component 102 and imbalance compensator 104 such that CG remains effectively unchanged. In some examples, a change in CG may be sensed or otherwise determined, and controller 106 may alter the position of imbalance compensator 104 in response to the change in CG, regardless of the cause. See section IX for detailed examples.

Figure 4:
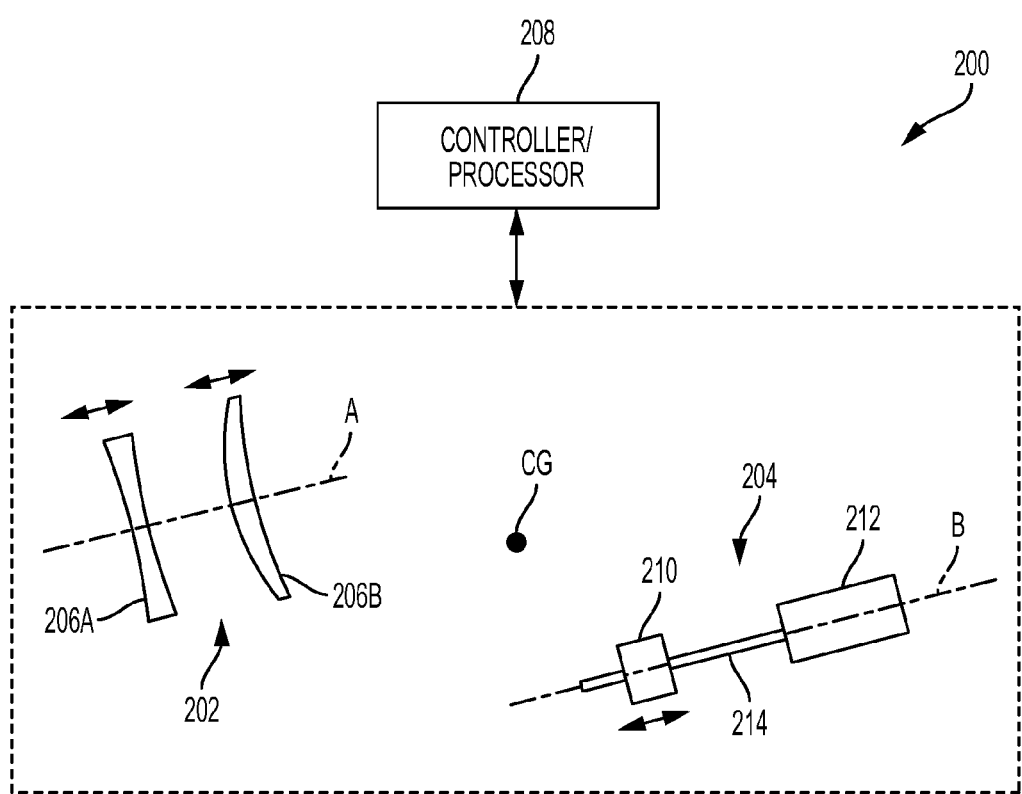
FIG. 4 is a schematic diagram of an illustrative gimbal system having an imbalance compensation system.

Turning to FIG. 4, an exemplary turret unit may incorporate a payload 200 having an imaging system with a zoom lens 202, and an imbalance compensator 204.

Payload 200 may include an imaging system, which may include optics configured to detect incident radiation, for example, infrared radiation or visible light. In this example, the imaging system includes a zoom lens 202 having movable optical components 206A and 206B. As optical component 206A and/or 206B moves, here shown as moving along an axis A, the mass of the optical component(s) will also move toward or away from the original center of gravity (CG) of the payload. If uncompensated, CG may shift and the payload may no longer be balanced.

To compensate, a controller 208 may sense a shift in CG, may sense or be informed of a movement of components 206A and 206B, and/or may control the movement of components 206A and 206B. Controller 208 may respond, either simultaneously or asynchronously. This response may include causing imbalance compensator 204 to reposition a mass 210 to compensate for the change (or potential change) in CG. For example, a motor 212 such as a DC servo motor or stepper motor may be utilized to rotate a lead screw 214 and thereby reposition mass 210 by a known amount or to a desired position. Mass 210, in this example, may include a threaded weight or slug operatively connected to the lead screw. In some examples, mass 210 may be operatively connected to a different type of driver or prime mover such as a pneumatic or hydraulic cylinder, a linear piezo motor, a barrel cam, or the like, and/or any combination of these. To accomplish these functions, controller 208 may be in operative control and/or communication with the imaging system, the imbalance compensator, or both.

In FIG. 4, mass 210 is movable along an axis B that is parallel with axis A of the optical components. In some examples, axis A and axis B may be collinear. In some examples, components 206A, 206B and/or mass 210 may move along non-linear or curved paths. Regardless of the relationship and shape of the paths, mass 210 will be repositioned by an amount necessary to at least partially offset the effect on CG of the moving optical component(s). That amount may correspond to the amount of imbalance along the axis of travel of mass 210.

Figure 7:
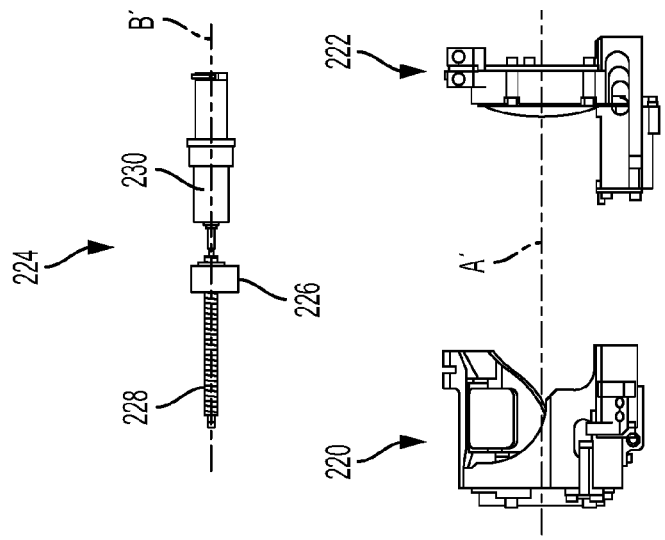
FIGS. 5-7 are partial side elevation views of illustrative optical and imbalance compensation system components, in accordance with aspects of the present disclosure, showing their relative positions at various focal lengths.
Figure 6:
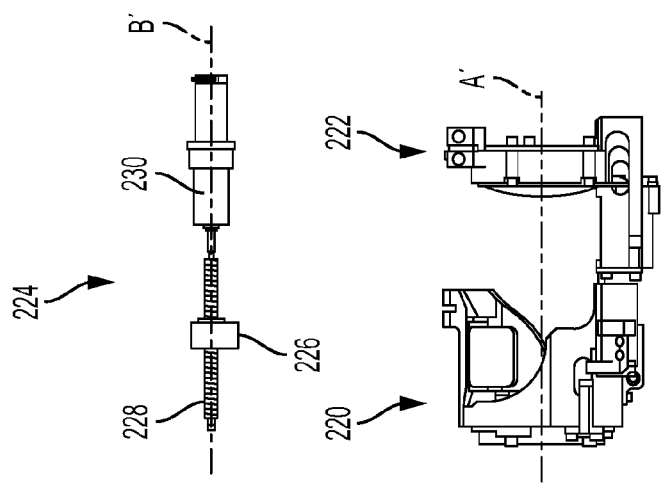
Figure 5:
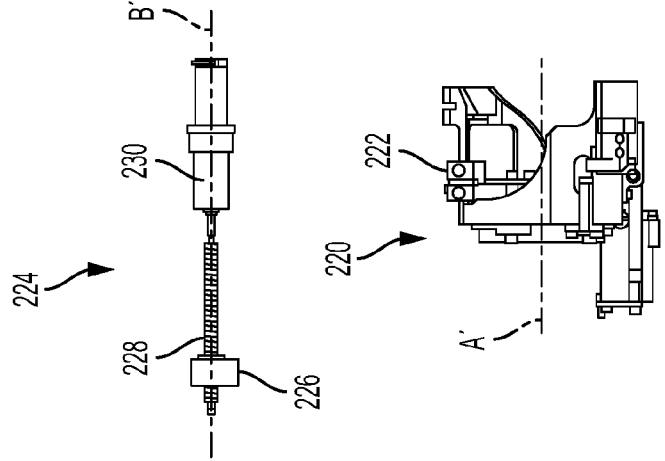
Figure 8A:
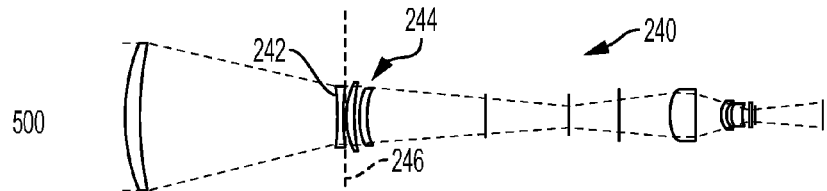
FIG. 8A is a schematic diagram showing a first position of movable lenses relative to focal length in an illustrative zoom lens.
Figure 8B:
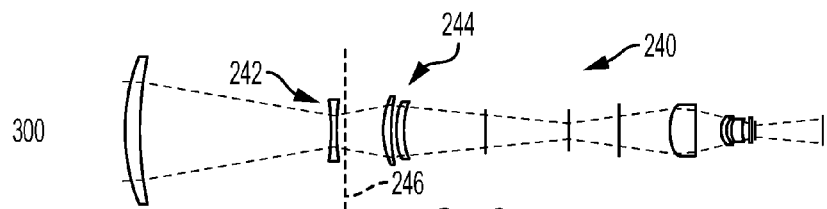
FIG. 8B is a schematic diagram showing a second position of movable lenses relative to focal length in the zoom lens of FIG. 8A.
Figure 8C:
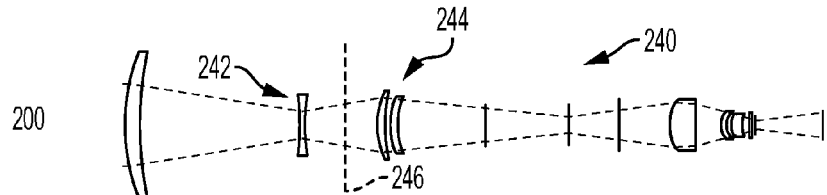
FIG. 8C is a schematic diagram showing a third position of movable lenses relative to focal length in the zoom lens of FIG. 8A.
Figure 8D:
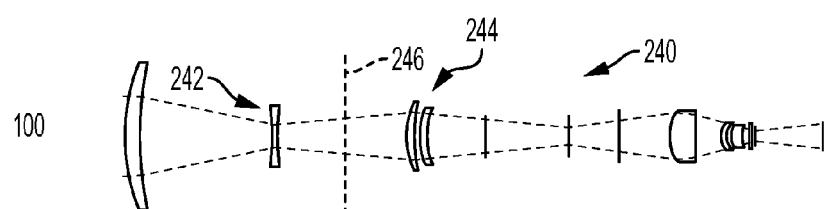
FIG. 8D is a schematic diagram showing a fourth position of movable lenses relative to focal length in the zoom lens of FIG. 8A.
Figure 8E:
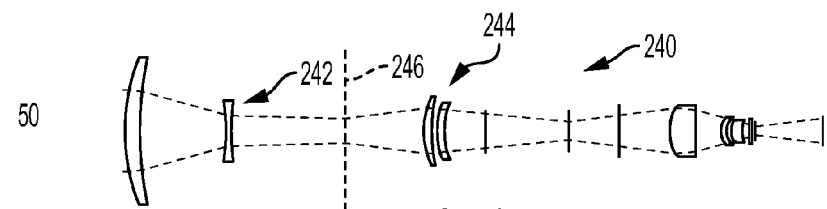
FIG. 8E is a schematic diagram showing a fifth position of movable lenses relative to focal length in the zoom lens of FIG. 8A.
Figure 8F:
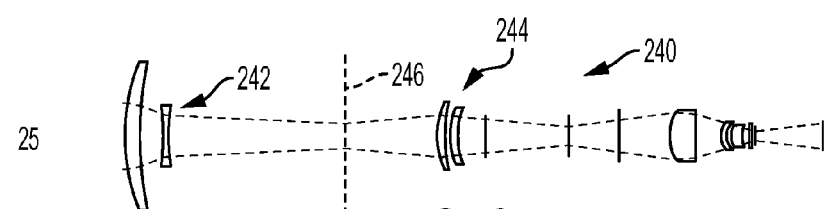
FIG. 8F is a schematic diagram showing a sixth position of movable lenses relative to focal length in the zoom lens of FIG. 8A.

FIGS. 5-7 depict a variator lens group 220 and a compensator lens group 222 (embodiments of optical components 206A and 206B, respectively) as well as an imbalance compensator 224 (an embodiment of imbalance compensator 204), taken out of context and placed adjacent to each other to show relative positioning in different operational configurations. Variator lens group 220 and compensator lens group 222 are mutually movable with respect to each other, as typically found in a zoom lens. Imbalance compensator 224 includes a movable mass 226, a lead screw 228, on which movable mass 226 travels, and a motor 230 to turn the lead screw.

In FIG. 5, a narrow field of view (NFOV) may be accomplished by placing variator group 220 adjacent to compensator group 222, and mass 226 of imbalance compensator 224 may be extended fully in one direction along an axis B'. In FIG. 7, a wide field of view (WFOV) may be accomplished by moving variator group 220 away from compensator group 222 along an axis A', thereby altering CG such that mass 224 must be repositioned fully in the other direction along axis B'. In FIG. 6, a middle ground may be reached, both in terms of the separation between the variator and the compensator and in terms of the positioning of the imbalance compensator.

Figure 9:
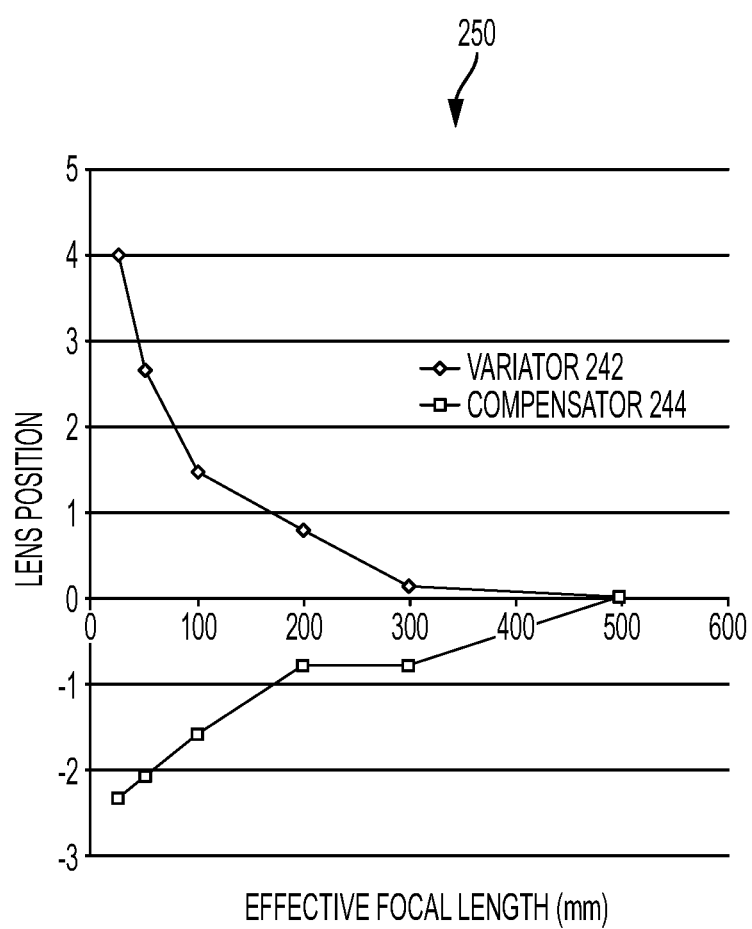
FIG. 9 is a chart of lens positions vs. focal length for the zoom lens shown in FIGS. 8A-8F.

FIGS. 8A-8F depict, for an illustrative zoom lens 240, the relative positions of a variator 242 and a compensator 244 at various effective focal lengths. FIG. 9 is a chart of the lens positions shown in FIGS. 8A-8F. The focal lengths are listed along the left side of FIGS. 8A-8F and along the x-axis of accompanying chart 250 in FIG. 9. A reference line 246 is included in FIGS. 8A-8F, and the lens positions are measured relative to line 246.

As shown in FIGS. 8A-8F and charted in FIG. 9, the lens positions do not follow symmetrical paths as the overall system changes focal length. In other words, although variator 242 changes its position in a predictable manner, that change of position is not mirrored by compensator 244 as the two lens assemblies move away from reference line 246. For example, at a 300 mm focal length, variator 242 is closer to the reference line than compensator 244 is. However, when zoomed out to a 25 mm focal length, variator 242 is almost twice as far from the reference line as compared to compensator 244. Furthermore, when zooming between 200 mm and 300 mm, compensator 244 stays effectively stationary, while variator 242 moves significantly.

As this example shows, an unbalancing effect on CG may be complex when multiple components are repositioned simultaneously. The unbalancing effect may, however, be predictable or known. In some examples, the effect of each movable component may be accounted for individually, with the collective effect then mathematically determined. In some examples, the changes in position may be handled on a group or mechanism basis. A controller may be programmed to determine an effect on CG and/or an appropriate corresponding compensatory position of the imbalance compensator for all expected positions of variator 242 and compensator 244.

The system may encompass a variety of embodiments. In some examples, the collective contribution of various zoom lens components amounts to an imbalance in the payload, measured as a torque, of over 0.7 inch-pounds. In some examples, a zoom lens may have three moving elements: a variator (group), a compensator (group), and a focusing lens (group). In some examples, a payload may include a plurality of zoom lenses. In some examples, a single imbalance compensator may be used to compensate for a plurality of zoom lenses and/or other moving components. In some examples, a plurality of imbalance compensators may be included to compensate for one or more moving components.

VIII. Gimbal Assembly Having an Imaging System and an Imbalance Compensator

Figure 10:
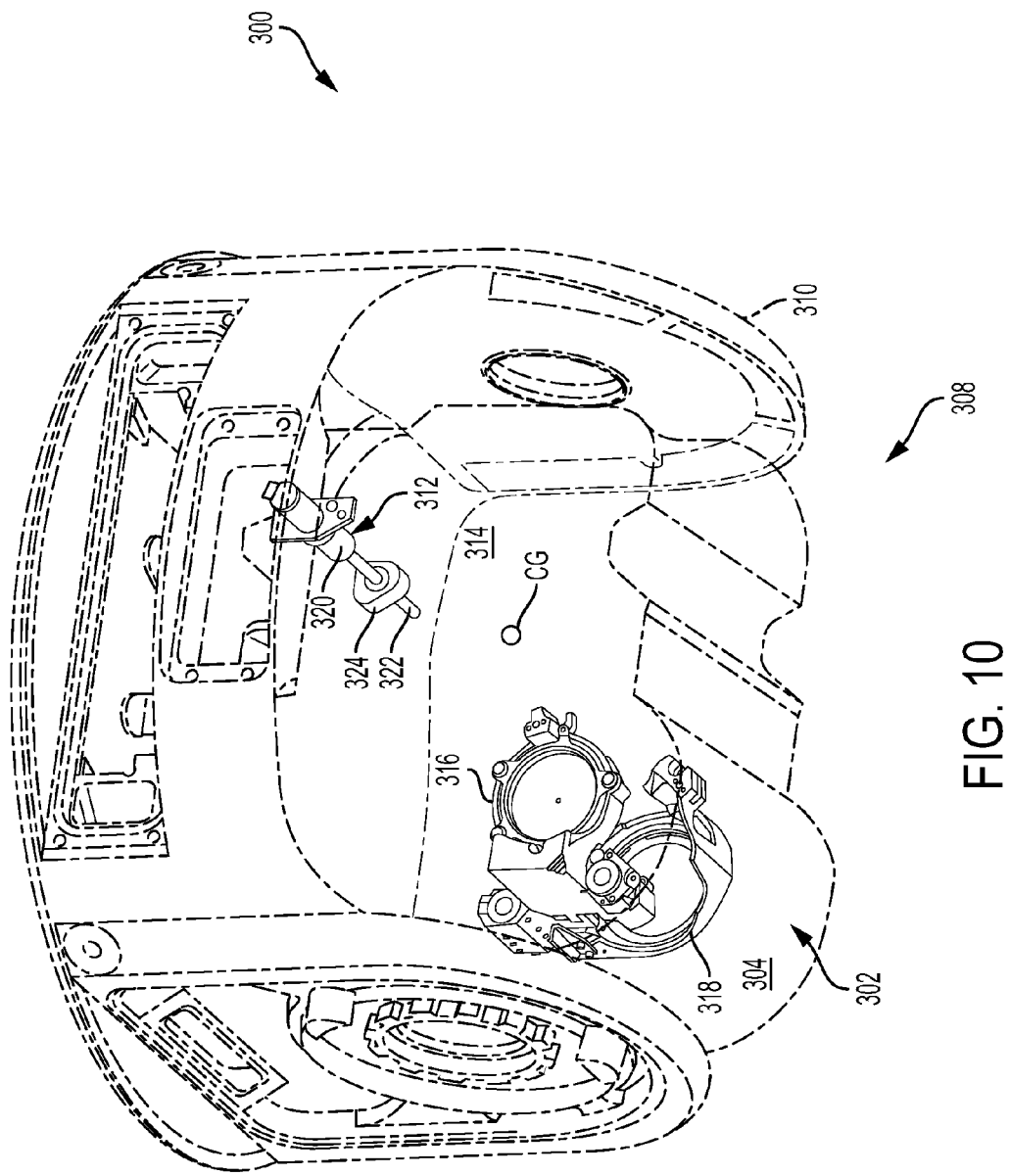
FIG. 10 is an isometric cutaway view of an illustrative gimbal system showing physical relationships between lens components and an imbalance compensator, in accordance with aspects of the present disclosure.
Figure 11:
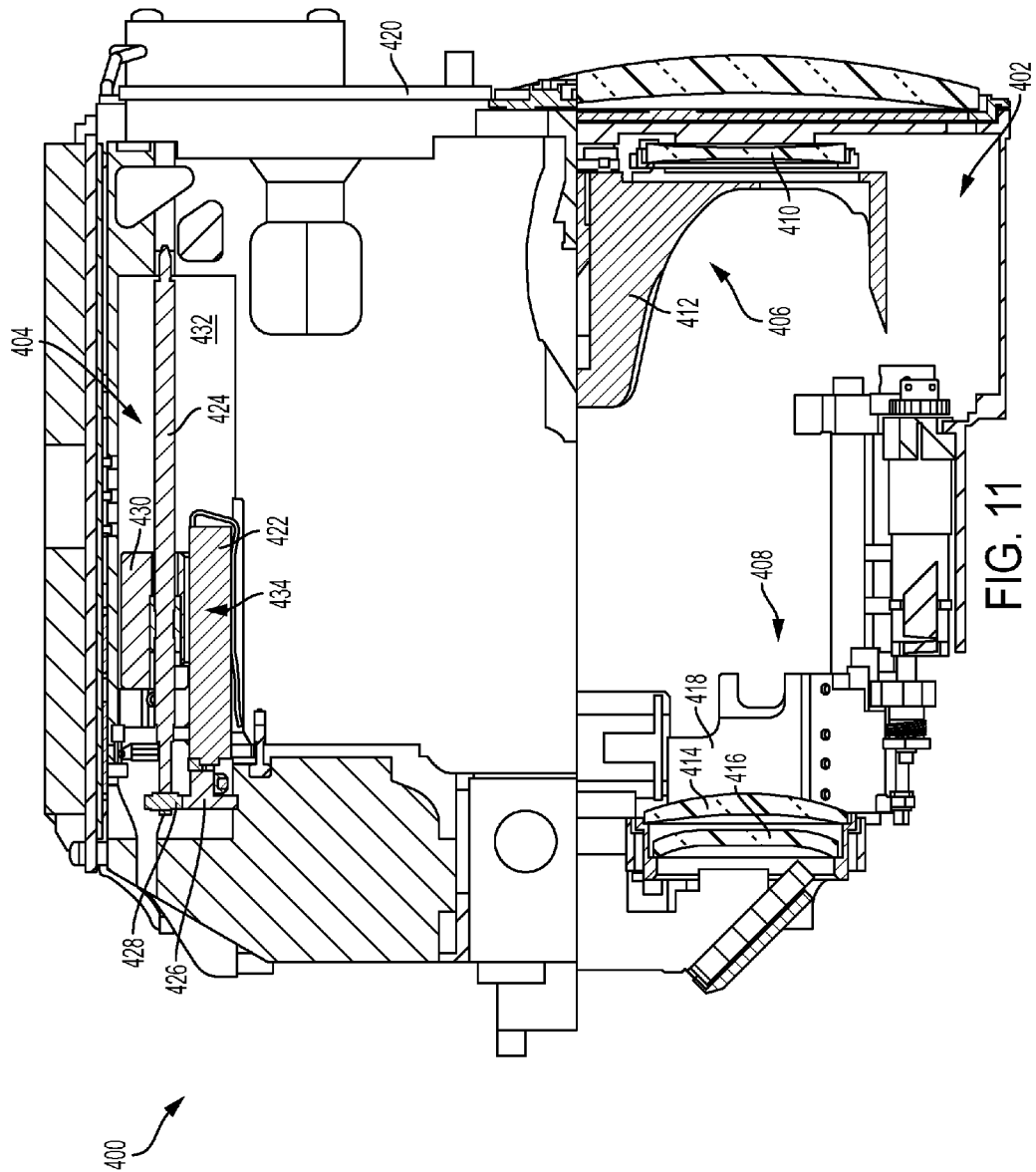
FIGS. 11 and 12 are sectional side views of an illustrative gimbal system, showing relationships between an imbalance compensator and a lens system in two selected configurations.
Figure 12:
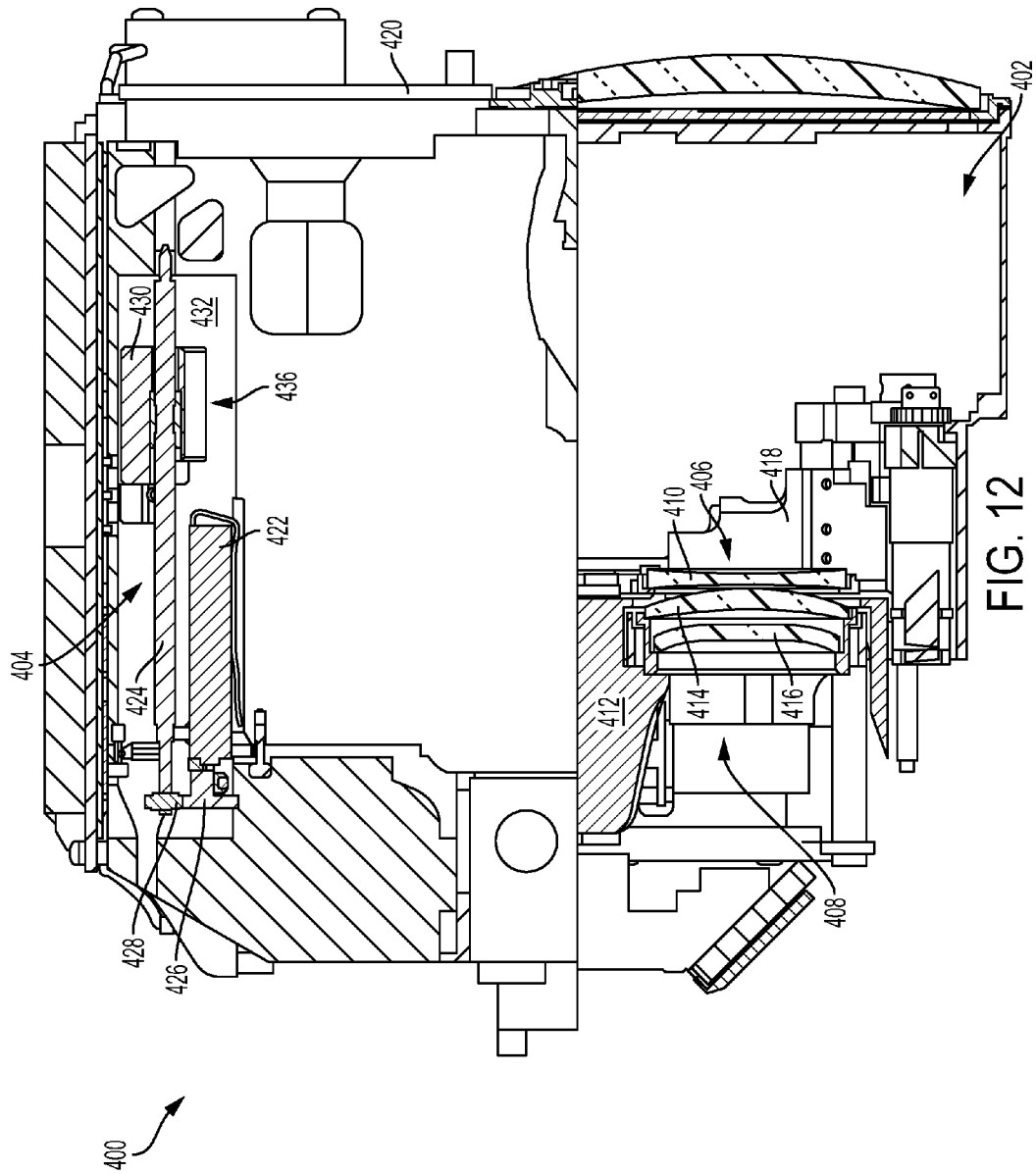

This section describes exemplary turret units incorporating a payload with a zoom lens and an imbalance compensator; see FIGS. 10-12.

FIG. 10 is a partial isometric view of an illustrative turret unit 300, showing relative positions and spatial relationships among various components. In this example, a zoom lens 302 is located in a lower left quadrant 304 of a payload 306 in a gimbal system 308 having a housing 310. An imbalance compensator 312 is generally located in an upper right quadrant 314. A center of gravity of the gimbal/payload is depicted at CG. The axis of the zoom lens and the axis of the imbalance compensator may be substantially parallel.

Zoom lens 302, in this example, includes moving elements in the form of a compensator lens 316 and a variator lens 318, substantially as described above. Imbalance compensator 312 includes a motor 320 (e.g., a stepper motor) operatively connected to a lead screw 322 and a weight or mass 324. Motor 320 may be mounted or otherwise fixed to the body of payload 306, for example, by a bracket or other structure, and mass 324 may be movably attached to the lead screw. Accordingly, rotation of lead screw 322 by motor 320 causes mass 324 to travel along the lead screw as a result of internal threading on the mass interacting with external threading on the lead screw. Precise positioning of mass 324 may therefore be possible by precisely controlling the number and direction of revolutions of the motor and lead screw. A rotary encoder may be included and/or incorporated into the electric motor to provide precise and accurate positioning information regarding lead screw 322. This positioning information may be provided to the controller or processor (e.g., processor 64).

Turning to FIGS. 11 and 12, another illustrative payload 400 is depicted in sectional side view. In this example, a zoom lens 402 is located in a lower portion of the payload, and a corresponding imbalance compensator 404 is located in an upper portion of the payload. Axes of zoom lens 402 and compensator 404 may be substantially parallel, and may be aligned vertically, with one over the other. This arrangement may be dictated in part by available space within the payload, based on other equipment and manufacturing requirements. In general, however, as described above, the axis of travel for each movable component should be parallel to the axis of travel of the movable mass of the imbalance compensator.

Zoom lens 402, like others described above, includes two movable lens assemblies: a variator lens assembly 406 and a compensator lens assembly 408. Variator lens assembly 406 includes a concave lens 410 and a first housing 412, movable as a unit toward and away from the compensator lens assembly. Compensator lens assembly 408 includes a pair of convex lenses 414 and 416, and a second housing 418, all of which are coaxial with the variator, as well as movable toward and away from the variator. As shown in FIGS. 11 and 12, the imbalance compensator and zoom lens 402 are contained at least in part by a payload housing or frame 420.

With continuing reference to FIGS. 11 and 12, imbalance compensator 404 includes an electric motor 422 driving a lead screw 424 via a 180-degree gear combination comprising a driving gear 426 and a driven gear 428. Imbalance compensator 404 also includes a mass or weight 430. Weight 430 may also be referred to as a slug or block. Weight 430 may include any suitable materials and may take any suitable shape and/or size. In some examples, weight 430 may comprise tungsten. Tungsten and other relatively heavy or dense materials may be especially suitable because denser materials facilitate weight 430 being smaller and/or taking up less space. Such a relatively heavy block of material may require less travel for any given compensation, as compared to a lighter weight. The block may be shaped to fit within a passageway 432 in the payload or gimbal assembly, such that weight 430 may have a selected range of travel along a predetermined path. In this example, the path is linear, as the weight travels along a linear screw 424.

FIGS. 11 and 12 depict zoom lens 402 in two substantially extreme configurations. Specifically, FIG. 11 depicts payload 400 with lens assemblies 406 and 408 spaced widely apart, similar to the WFOV configuration of FIG. 7 and/or the 25 mm example of FIGS. 8 and 9. In this configuration, weight 430 of imbalance compensator 404 is positioned at or near a rear extreme of travel, in a first position 434.

On the other hand, FIG. 12 shows lens assemblies 406 and 408 moved adjacent to each other, similar to the NFOV configuration of FIG. 5 and/or the 500 mm example of FIGS. 8 and 9. Variator lens 406 has moved toward the rear of the payload, and compensator lens 408 has moved toward the front, with the variator moving farther than the compensator lens. Uncompensated, this movement would shift the balance of the payload and gimbal assembly to the rear. Accordingly, a controller or processor has positioned weight 430 to a forward, second position 436 to compensate. Note that the first and/or second positions of weight 430 may not be at extremes of travel. This may be due to various reasons, including a need to compensate for additional movable components other than the two lens assemblies 406, 408.

IX. Balance Control Algorithms

This section describes various aspects of balance control algorithms that may be suitable for use with imbalance compensation systems in accordance with aspects of the present disclosure.

As described above, the controller and/or processor associated with an imbalance compensation system may coordinate the direction and amount by which a mass is repositioned. This repositioning is done to maintain or reestablish a center of gravity (CG) of the overall host system. The CG may be a known geometric location. However, this information may not be necessary for the system to maintain or reestablish the CG. For example, repositioning the movable mass may be performed in direct response to a measured or known change in position of another component, without specifically determining a change in the CG.

A balance control algorithm may be followed by the controller/processor. A processor may execute a stored set of instructions configured to receive positional input corresponding to one or more movable components, to determine a position of a movable weight to counteract the net effect of the movable component(s), to determine an amount and direction of travel required to locate the movable weight to that position, and to output a command to position the movable weight accordingly. In some examples, the processor may output the desired location to a positioning system, and the positioning system may perform the determination of how far and in which direction to move the weight. Determining the amount and direction of travel for the movable weight may include determining a required position, and then determining a difference between the required position and the actual position of the mass. This process may include one or more feedback loops.

In some embodiments, the controller may receive position information from each movable mechanism or component in the host system. For example, each movable component may include a position sensor. These position sensors may be used to determine and track the position of the movable component. An imbalance compensation system may take advantage of these sensors to receive information on the actual positions of the movable components. In some embodiments, theoretical or expected positions may be used instead of, to supplement, and/or as a back-up to the sensor data.

In general, a balance control algorithm utilizes position information from each movable mechanism/component to determine the overall imbalance in the host system. This overall imbalance is the sum of the individual imbalances of the various movable components. This concept is represented by the equation below:

$$\text{Imbalance}_{SYS} = \Sigma \text{Imbalance}_n$$

Imbalance$_n$ is the respective imbalance resulting from a given "nth" movable component. Imbalance$_{sys}$ is the overall imbalance of the host system. For example, if a host system includes three movable components—J, K, and L—then the overall imbalance is equal to Imbalance$_J$+Imbalance$_K$+Imbalance$_L$. The overall imbalance may be referred to as an effective moment caused by the one or more movable components, or may correspond to such an effective moment on the system. The movable mass (i.e., weight) of the imbalance compensation system will be positioned to compensate for this overall imbalance (i.e., effective moment).

Components may move symmetrically with respect to each other. In many cases, however, components may move asymmetrically, as shown in FIGS. 8 and 9. Additionally, each individually movable component may cause imbalance in one of two ways: linearly and/or nonlinearly (i.e., in a straight line and/or in a curved line). For movable components that move in a strictly linear fashion, the individual imbalance can be calculated as follows:

$$\text{Imbalance}_n = M_n \times P_n$$

$M_n$ is the mass of the nth component, and $P_n$ is the position of the nth component in a given frame of reference. $P_n$ may be measured as a distance from a known reference point. This distance may be determined (e.g., calculated) based on position sensor feedback associated with each component.

This imbalance may be referred to as a moment, a moment arm, or a moment calculation. A moment is often expressed in terms of a force multiplied by a distance, and weight may therefore be used rather than mass when calculating imbalances. However, acceleration due to gravity is effectively constant for all relevant components and frames of reference. Accordingly, mass and weight are interchangeable for the purposes of this discussion, so long as the units are consistent across calculations.

As mentioned, certain components may move in a nonlinear fashion. For example, a lens assembly may have one or more linearly-moving lenses with respect to the axis of the lens assembly. The same lens assembly may pivot, e.g., up and down, to follow a target. Accordingly, the motion of the lenses will be seen on more than one axis. This rotational or nonlinear movement causes a corresponding imbalance to the overall system. However, that imbalance cannot be calculated using the Imbalance formula above.

The moment may be calculated in these situations using changes in known characteristics of the component in question. In some examples, the imbalance effect may be determined empirically, i.e., by observation. In other words, the imbalance effect of moving the component in a nonlinear fashion may be observed at various points. The amount of imbalance at other points can then be determined by interpolation and/or extrapolation.

In examples where the effect is determined empirically, the balance compensation algorithm may look up or otherwise determine an imbalance based on the value of a related variable. The value of a variable (e.g., rotational angle of a lens barrel) may be received by the controller, which then looks up the corresponding imbalance effect due to that value. This method may be performed using a linear-interpolated lookup table. Accordingly, for a nonlinear component, imbalance may be determined according to the following equation:

$$\text{Imbalance}_n = f(\text{Var}_n)$$

In this equation, $f(\text{Var}_n)$ indicates that the imbalance of the nth component is a function of a variable measured for that same component. In examples where the imbalance is determined by looking up the value of Var in a table, the "function" is simplified to be a look up and/or interpolation. In those examples, the variable value can be said to "yield" the imbalance. In examples where the imbalance is determined by a calculation, one or more variable characteristics of the nth component are used to determine or approximate the imbalance effect. In some examples, more than one variable may be used to calculate or look up the imbalance.

The movable weight is essentially a component having a mass and movable along a linear path. Accordingly, the counterbalance effect (i.e., the moment) of the movable weight may be calculated similar to any other linear component, as follows:

$$\text{Counterbalance}_m = M_m \times P_m$$

$\text{Counterbalance}_m$ refers to the counterbalance effect of the movable weight. $M_m$ is the mass of the movable weight. $P_m$ is the position of the movable weight with respect to the given frame of reference. Because the movable weight is on a fixed path, with a fixed length of travel, $P_m$ will be limited to a predetermined range of values. Like $P_n$, the value of $P_m$ may be determined by measuring how far the weight is from a known reference point. In the case of the movable weight, this distance may be determined based on revolutions of the lead screw, encoder counts, or the like.

The goal or target of the balance compensation method is to compensate for the overall imbalance of the system, e.g., by positioning the movable weight. Accordingly, a total imbalance of the system, including the movable weight, may be determined, and then set to zero. The algorithm may then calculate a position for the weight based on the imbalance. This concept is reflected in the following equations:

$$\text{Total Imbalance} = \text{Counterbalance}_m + \Sigma \text{Imbalance}_n$$

$$\text{Total Imbalance} = (M_m \times P_m) + \Sigma \text{Imbalance}_n$$

To bring the system into balance, or to maintain balance, i.e., to maintain the center of gravity, the total imbalance should be zero, as described. In other words:

$$\text{Total Imbalance} = 0$$

Solving for the position of the weight will then determine where the movable weight should be located to maintain the CG:

$$P_m = -\left(\frac{\sum \text{Imbalance}_n}{M_m}\right)$$

In other words, the required position of the movable weight may be equivalent to the negative of the net system imbalance divided by the mass of the movable weight.

This relationship assumes all of the individual $P_n$ readings are in the same frame of reference. In some examples, this is not the case. For example, each sensor may have an arbitrary "zero" point (i.e., reference position) and/or direction of travel from that zero point. The direction may be accounted for, e.g., by setting the positive or negative sign of the component's mass. Additionally or alternatively, the calculations may be adjusted by one or more offset values. In some examples, these offsets may be accounted for on a component level. In other words, the nth component may have a corresponding nth offset value in its imbalance equation to translate the respective frame of reference.

In other examples, such as the one reflected in the equation below, a single offset value may be determined and applied at the end of the calculation. For example, individual component offset values may be summarized and added to the final $P_m$ formula. Determination of an overall offset value may allow the effect of that value to be checked against a permissible range. For example, a certain range of offsets may be feasible based on the range of travel of the movable weight.

$$P_m = -\left(\frac{\sum \text{Imbalance}_n}{M_m}\right) + \text{OFFSET}_{SYS}$$

The algorithm outlined above (i.e., receiving the sensor data and determining the required position of the movable weight) is executed on a frequent basis, such that the CG of the host system is effectively maintained. In some examples, the algorithm is executed or updated multiple times per second. In some examples, the algorithm is updated two hundred times per second (i.e., at 200 Hz). At each update, the controller may command the movable weight assembly to drive to the required position based on the instantaneous positions of the various movable components.

IX. Method

Figure 13:
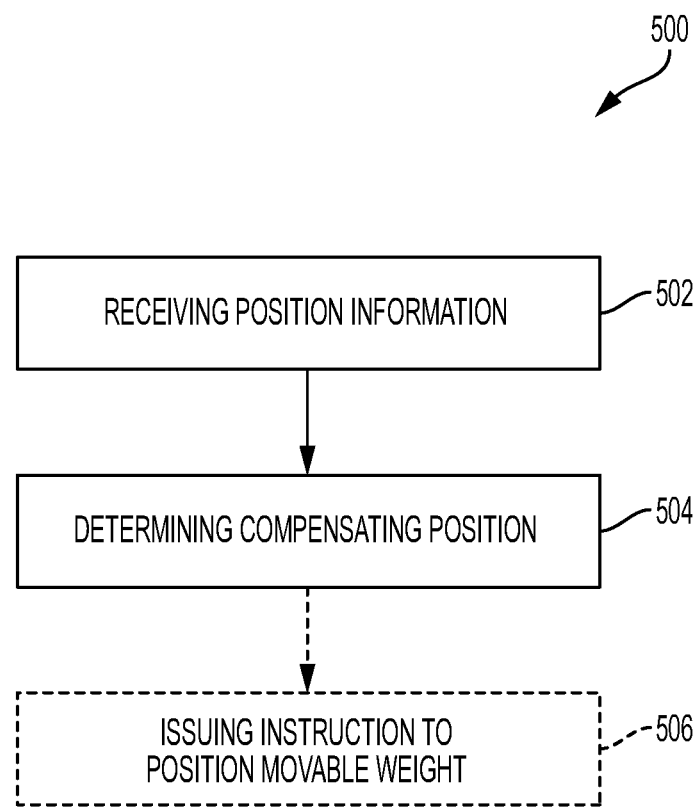
FIG. 13 is a flow chart depicting selected steps of an illustrative method for maintaining a center of gravity in a gimbal system having movable components

This section describes a method for maintaining a desired (or selected) center of gravity of a gimbal assembly using a movable mass; see FIG. 13. Aspects of systems described above may be utilized in the method steps described below. Where appropriate, reference may be made to previously described components and systems that may be used in carrying out each step. These references are for illustration, and are not intended to limit the possible ways of carrying out any particular step of the method.

FIG. 13 is a flowchart illustrating operations performed in an illustrative method, and may not recite the complete process or all steps of the process. FIG. 13 depicts multiple steps of a method, generally indicated at 500, which may be performed in conjunction with gimbal assemblies having imbalance compensation systems, according to aspects of the present disclosure. Although various steps of method 500 are described below and depicted in FIG. 13, the steps need not necessarily all be performed, and in some cases may be performed in a different order than the order shown.

Step 502 of method 500 may include receiving, by a processor, information corresponding to a respective current position of one or more movable components in a gimbal assembly. The processor may include any suitable computer or the like. An example of a suitable processor is described above in Section II, with respect to processor 64. The processor may be interchangeably referred to as a controller. In some examples, a controller may comprise the processor. In some examples, the processor may comprise a controller.

In some examples, the information corresponding to the respective current position of at least one of the one or more movable components may be received by the processor from a position sensor associated with the at least one movable component. In some examples, the information corresponding to the respective current position of at least one of the one or more movable components may be used by the processor to calculate an expected position of the at least one movable component. In the absence or upon the failure of a position sensor, other information related to the position of the movable component may be available. For example, a movable component may be commanded to a known position, and the processor may assume that the known position has been attained. In other examples, a movable component may be positionable by a rotatable driver having an encoder that provides rotation counts to the processor. These rotation counts may be translated into the current position of the movable component.

As described above, the one or more movable components may include structures such as lenses, housings, and the like (e.g., components 206A and 206B, lens assemblies 406 and 408, etc.). These components may be configured to move or translate along respective axes that are mutually parallel (e.g., axes A and B of FIG. 4).

Step 504 of method 500 may include determining, by the processor, a compensating position of a movable weight in the gimbal assembly, such that the compensating position negates an effective moment on the gimbal assembly caused by the respective current positions of the one or more movable components. The movable weight may include a structure such as mass 210 or movable weight 430 of imbalance compensator 404. Determining the compensating position may be performed by any suitable method, including those described in detail in Section VIII, above.

As in examples described above, the gimbal assembly may include a driver in communication with the processor. In these examples, the driver is operatively connected to the movable weight. For example, a lead screw may connect a stepper (or other) motor to the movable weight, as described regarding imbalance compensator 404 and others. Other suitable drivers and configurations may be utilized. For example, a cylinder and piston may be used rather than a motor and lead screw. An optional step 506 of method 500 may further include communicating a command to the driver, by the processor, to move the movable weight to the compensating position. For example, the processor may instruct the motor to rotate the lead screw until the movable weight is located in the selected position.

X. Selected Embodiments

This section describes additional aspects and features of an imbalance compensation system, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A gimbal system, comprising:
  a support portion;
  a gimbal assembly pivotably connected to and supported by the support portion; and
  a payload pivotably orientable with respect to the support portion by the gimbal assembly, to provide pan and tilt movement of the payload,
  the payload including a selectively positionable component such that repositioning of the component has an effect on a center of gravity (CG) of the gimbal assembly, an imbalance compensator having a movable weight operatively connected to a driver, and a controller in operative communication with the imbalance compensator;
  wherein the controller is configured to counteract the effect of the positionable component on the CG by causing the imbalance compensator to reposition the movable weight.

A1. The gimbal system of paragraph A0, wherein the controller is further configured to control selective positioning of the positionable component.

A2. The gimbal system of any of paragraphs A0 through A1, wherein the positionable component includes an optical lens.

A3. The gimbal system of any of paragraphs A0 through A2, wherein the driver of the imbalance compensator includes an electric motor.

A4. The gimbal system of any of paragraphs A0 through A3, wherein the imbalance compensator includes a lead screw operatively connecting the driver to the movable weight.

A5. The gimbal system of paragraph A4, wherein the imbalance compensator further includes a rotary encoder.

A6. The gimbal system of paragraph A5, wherein the controller is configured to determine a position of the movable weight corresponding to a signal received from the rotary encoder.

A7. The gimbal system of any of paragraphs A0 through A6, wherein the positionable component is configured to move along a first linear axis, and the movable weight is configured to move along a second linear axis parallel to the first axis.

A8. The gimbal system of paragraph A7, wherein the first axis is collinear with the second axis.

B0. A gimbal system comprising:
a support portion;
a gimbal assembly pivotably connected to and supported by the support portion;
a payload pivotably orientable with respect to the support portion by the gimbal assembly, to provide pan and tilt movement of the payload, the payload including an imbalance compensator having a weight selectively movable within the payload along a first axis; and
a controller configured to determine a compensating position of the weight of the imbalance compensator, such that the compensating position negates an imbalance in the gimbal assembly.

B1. The gimbal system of paragraph B0, wherein the imbalance in the gimbal assembly is affected by a first component movable within the payload along a second axis substantially parallel to the first axis.

B2. The gimbal system of paragraph B1, wherein the imbalance in the gimbal assembly is affected by a second component movable within the payload along a third axis substantially parallel to the first axis.

B3. The gimbal system of any of paragraphs B1 or B2, wherein the controller is further configured to receive input information indicating a current position of the first component.

B4. The gimbal system of paragraph B3, wherein the controller is further configured to calculate a moment on the gimbal system resulting from the current position of the first component.

B5. The gimbal system of any of paragraphs B0 through B4, wherein the controller is in operative communication with the imbalance compensator, and the controller is configured to command the imbalance compensator to move the weight to the compensating position.

C0. A method for maintaining a desired center of gravity in a gimbal system, the method comprising:
receiving, by a processor, information corresponding to a respective current position of one or more movable components in a gimbal assembly; and
determining, by the processor, a compensating position of a movable weight in the gimbal assembly, such that the compensating position negates an effective moment on the gimbal assembly caused by the respective current positions of the one or more movable components.

C1. The method of paragraph C0, wherein the gimbal assembly further includes a driver in communication with the processor and operatively connected to the movable weight, the method further comprising communicating a command to the driver, by the processor, to move the movable weight to the compensating position.

C2. The method of paragraph C1, wherein the driver is a stepper motor, and moving the movable weight to the compensating position includes rotating a lead screw coupled to the stepper motor.

C3. The method of any of paragraphs C0 through C2, wherein the information corresponding to the respective current position of at least one of the one or more movable components is received by the processor from a position sensor associated with the at least one movable component.

C4. The method of any of paragraphs C0 through C3, wherein the information corresponding to the respective current position of at least one of the one or more movable components is used by the processor to calculate an expected position of the at least one movable component.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A gimbal system, comprising:
a support portion;
a gimbal assembly pivotably connected to and supported by the support portion; and
a payload pivotably orientable with respect to the support portion by the gimbal assembly, to provide pan and tilt movement of the payload,
the payload including a selectively positionable component such that repositioning of the component has an effect on a center of gravity (CG) of the gimbal assembly, an imbalance compensator having a movable weight operatively connected to a driver configured to move the weight independent of the positionable component, and a controller in operative communication with the imbalance compensator;
wherein the controller is configured to counteract the effect of the positionable component on the CG by causing the imbalance compensator to reposition the movable weight; and
wherein the positionable component and the movable weight are internal to the payload.

2. The gimbal system of claim 1, wherein the controller is further configured to control selective positioning of the positionable component.

3. The gimbal system of claim 1, wherein the positionable component includes an optical lens.

4. The gimbal system of claim 1, wherein the driver of the imbalance compensator includes an electric motor.

5. The gimbal system of claim 1 wherein the imbalance compensator includes a lead screw operatively connecting the driver to the movable weight.

6. The gimbal system of claim 5, wherein the imbalance compensator further includes a rotary encoder.

7. The gimbal system of claim 6, wherein the controller is configured to determine a position of the movable weight corresponding to a signal received from the rotary encoder.

8. The gimbal system of claim 1, wherein the positionable component is configured to move along a first linear axis, and the movable weight is configured to move along a second linear axis parallel to the first axis.

9. The gimbal system of claim 8, wherein the first axis is collinear with the second axis.

10. A gimbal system comprising:
a support portion;
a gimbal assembly pivotably connected to and supported by the support portion;
a payload pivotably orientable with respect to the support portion by the gimbal assembly, to provide pan and tilt movement of the payload, the payload including an imbalance compensator having a weight selectively movable within the payload along a first axis;
a first component movable within the payload, independent of the imbalance compensator, along a second axis substantially parallel to the first axis; and
a controller configured to determine a compensating position of the weight of the imbalance compensator, such that the compensating position negates an imbalance in the gimbal assembly caused at least in part by a change in position of the first component.

11. The gimbal system of claim 10, wherein the imbalance in the gimbal assembly is further affected by a second component movable within the payload along a third axis substantially parallel to the first axis.

12. The gimbal system of claim 10, wherein the controller is further configured to receive input information indicating a current position of the first component.

13. The gimbal system of claim 12, wherein the controller is further configured to calculate a moment on the gimbal system resulting from the current position of the first component.

14. The gimbal system of claim 10, wherein the controller is in operative communication with the imbalance compensator, and the controller is configured to command the imbalance compensator to move the weight to the compensating position.

* * * * *